United States Patent [19]

Ochsenreiter

[11] Patent Number: 5,584,465
[45] Date of Patent: Dec. 17, 1996

[54] SOLENOID LATCHING VALVE

[75] Inventor: John E. Ochsenreiter, Erie, Pa.

[73] Assignee: Snap-Tite, Inc., Union City, Pa.

[21] Appl. No.: 163,672

[22] Filed: Dec. 7, 1993

[51] Int. Cl.⁶ .................................................... F16K 31/08
[52] U.S. Cl. ......................................... 251/65; 251/129.05
[58] Field of Search .................................. 251/65, 129.05

[56] References Cited

U.S. PATENT DOCUMENTS

| 4,056,255 | 11/1977 | Lace | 251/65 X |
| 4,793,588 | 12/1988 | Laverty. | |
| 4,971,287 | 11/1990 | Shaw. | |
| 5,025,828 | 6/1991 | Lin | 251/65 X |
| 5,067,687 | 11/1991 | Patel et al. | 251/65 X |
| 5,080,824 | 1/1992 | Chi. | |
| 5,169,118 | 12/1992 | Whiteside. | |
| 5,195,720 | 3/1993 | Nortier et al.. | |
| 5,259,416 | 11/1993 | Kunz et al. | 251/65 X |

*Primary Examiner*—Gerald A. Michalsky
*Attorney, Agent, or Firm*—Woodling, Krost & Rust

[57] ABSTRACT

A solenoid latching valve movable between open and closed positions employing a latching magnet and a spring to maintain a plunger in the open and closed positions respectively. Momentary direct electrical currents are switchably supplied to the electromagnetic coil which causes the plunger to shuttle between open and closed positions.

14 Claims, 9 Drawing Sheets

SOLENOID LATCHING VALVE

FIELD OF THE INVENTION

This invention relates to a solenoid latching valve for use in an automatic toilet and urinal flushing system. Specifically, the solenoid valve is "latched" magnetically in the open position to save energy. Similarly, the solenoid valve is kept in the closed position mechanically through the force of a spring, the operation of which will be described hereinbelow. The solenoid latching valve employs an electromagnetic coil having first and second leads. The solenoid latching valve is controlled by switchably engaging the first and second leads with a direct current (hereinafter "dc") voltage source.

BACKGROUND OF THE INVENTION

This invention involves a solenoid latching valve for use in retrofitting toilet and urinal flushing mechanisms. The solenoid latching valve is adaptable for controlling the flushing of the toilets and urinals. The solenoid latching valve is typically used in conjunction with a sensor which senses the presence of a person in proximity to a toilet or urinal. Personal hygiene is greatly enhanced by minimizing contact with a mechanical flushing apparatus.

In that the solenoid latching valve of the present invention is adaptable for use in retrofitting existing toilets and urinals, the demand is great. In retrofit applications, a solenoid latching valve which uses very little energy is necessary so as to make retrofitting practical. A battery is used to supply the energy to the electromagnetic coil.

The present invention employs an electromagnetic coil having first and second leads switchably connected to a dc voltage source. Energy is only expended in moving the plunger between the open and closed positions. In the open position, the plunger is "latched" magnetically by a magnet. By "latched," it is meant kept in position. In the closed position, the plunger is mechanically restrained in position by a spring.

It is an object of the present invention to provide a solenoid latching valve which minimizes the energy expenditure to move the valve between first and second positions.

It is a further object of the present invention to provide a solenoid latching valve which latches a plunger in the open position, also known as the second position of the plunger. By latching it is meant that a magnet maintains the solenoid valve in the open position following a momentary electric current in a first direction in the electromagnetic coil. In a similar fashion, a spring is employed which maintains the plunger in a closed position, also known as the first position of the plunger.

It is a further object of the present invention to provide an electromagnetic coil coaxially disposed about a plunger guide, plunger stop and a plunger. The plunger resides partially within said plunger guide.

It is a further object of the present invention to provide a solenoid latching valve having a plunger adapted to include a valve and a seal retained within the plunger. The seal provides a tight shut-off against a seat integrally formed in the body of the solenoid latching valve.

It is a further object of the present invention to provide a solenoid latching valve having an electromagnetic coil operable with electrical currents having small magnitude resulting in a low power expenditures.

DETAILED DESCRIPTION OF THE INVENTION

Figure 1:
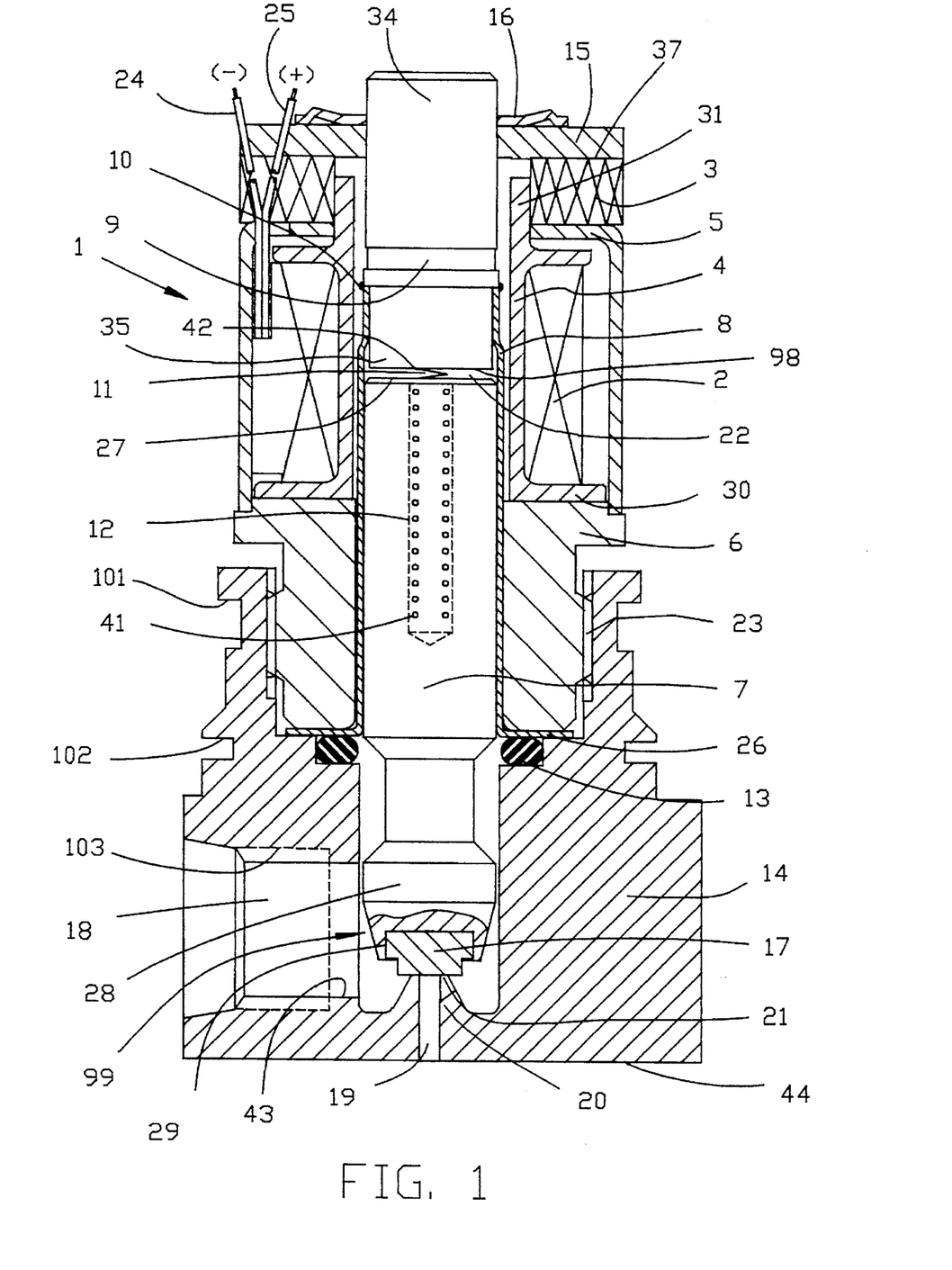
FIG. 1 is a cross-sectional view of the solenoid latching valve showing the plunger in the first position, for example, the valve is closed.
Figure 4:
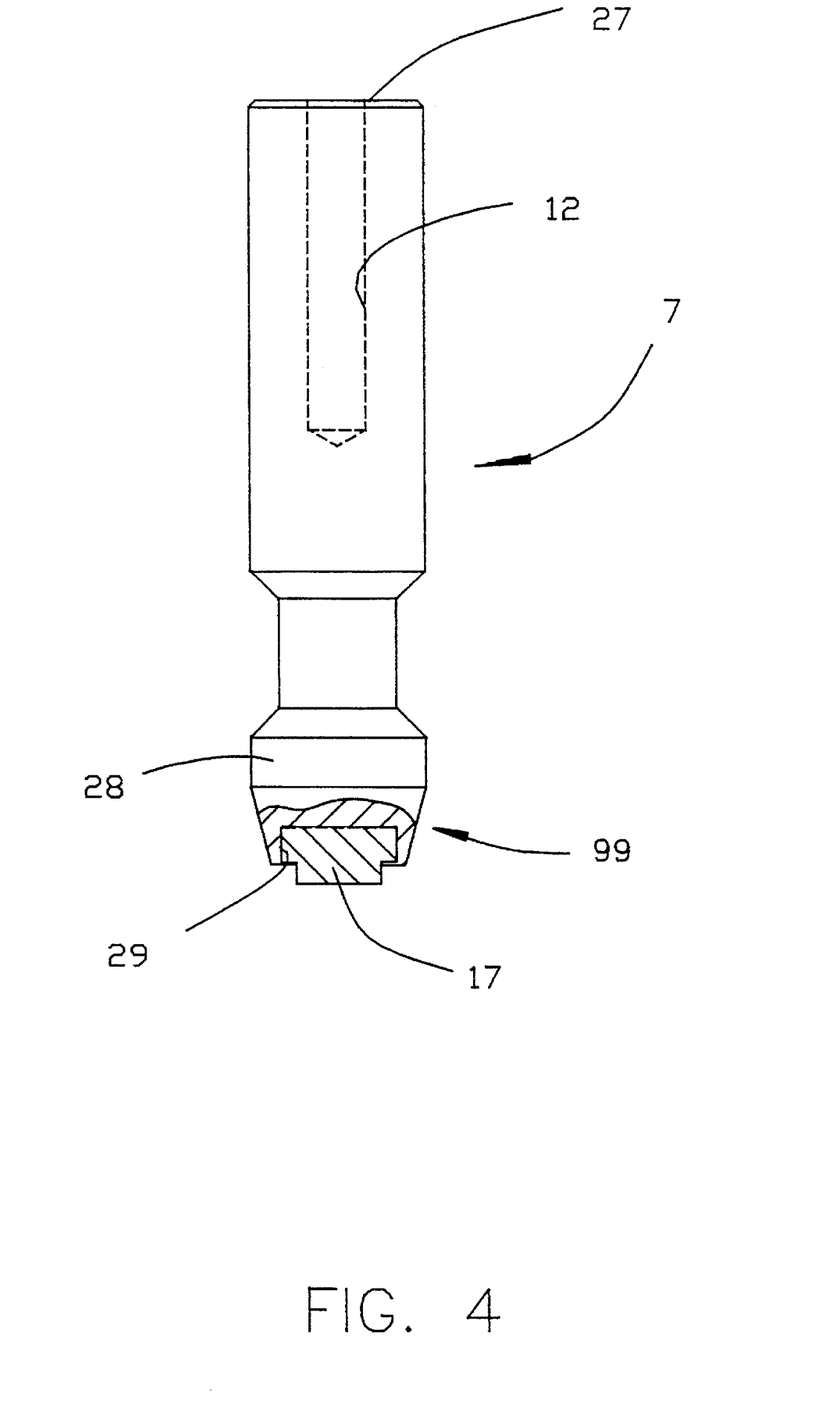
FIG. 4 is a plan view of the plunger including a cut-away portion showing the seal in the valve.

FIG. 1 is a cross-sectional view of the solenoid latching valve 1 showing the plunger 7 in the first position. FIG. 4 is a plan view of the plunger 7 including a cutaway portion showing the seal 17 in the valve 99. Plunger 7 has first and second end portions (28, 27) and a recess 29 in the first end portion. The valve 99 resides generally in the first end portion 28 of the plunger. Seal 17 of the preferred embodiment is a rubber material capable of machining yet flexible enough for insertion into recess 29 in the first end portion of the plunger.

It is important that the seal material used for the seal 17 be capable of machining. The plunger 7 must be a specified length to ensure proper function. The plunger further includes a spring cavity 12 in the second end portion 27.

Figure 3:
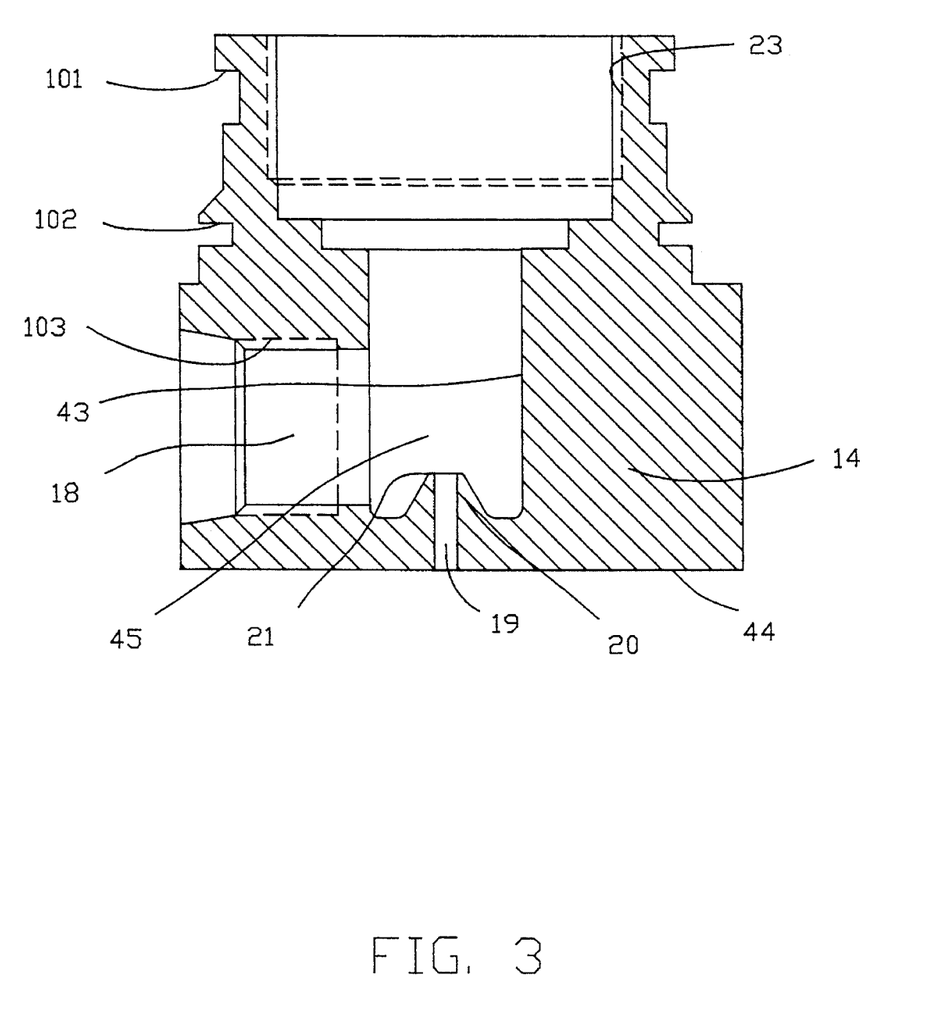
FIG. 3 is a cross-sectional view of the body showing the inlet, outlet and valve seat.

FIG. 3 illustrates a cross-sectional view of the body 14. Body 14 may be manufactured from many different materials including, but not limited to, brass. The body has an interior 43, an exterior 44 and a passageway 45. Additionally, the body 14 has an inlet 18 and an outlet 19. The body also has an inwardly extending frusto-conical portion 20. Outlet 19 of body 14 is a bore which extends from the exterior 44 of the body 14 to the interior 43 of the body 14. The frusto-conical portion 20 forms valve seat 21. The valve seat 21 engages the seal 17 of the valve 99 as will be hereinafter set forth. First and second (101 and 102) annular recesses exist in the exterior 44 of body 14. The first annular recess 101 receives an elastomeric seal (not shown) for sealing the solenoid latching valve against a receptacle (not shown). A second annular recess 102 receives a retaining clip (not shown) for retaining the solenoid latching valve within the receptacle (not shown). The receptacle may be rotated with respect to the solenoid latching valve.

The inlet 18 of the body 14 is threaded enabling easy connection to a water conduit (not shown). It will be recognized by those skilled in the art that connection means other than threads may be used. For instance, a weld or press fit may be used to secure the water conduit to the inlet 18.

Figure 5:
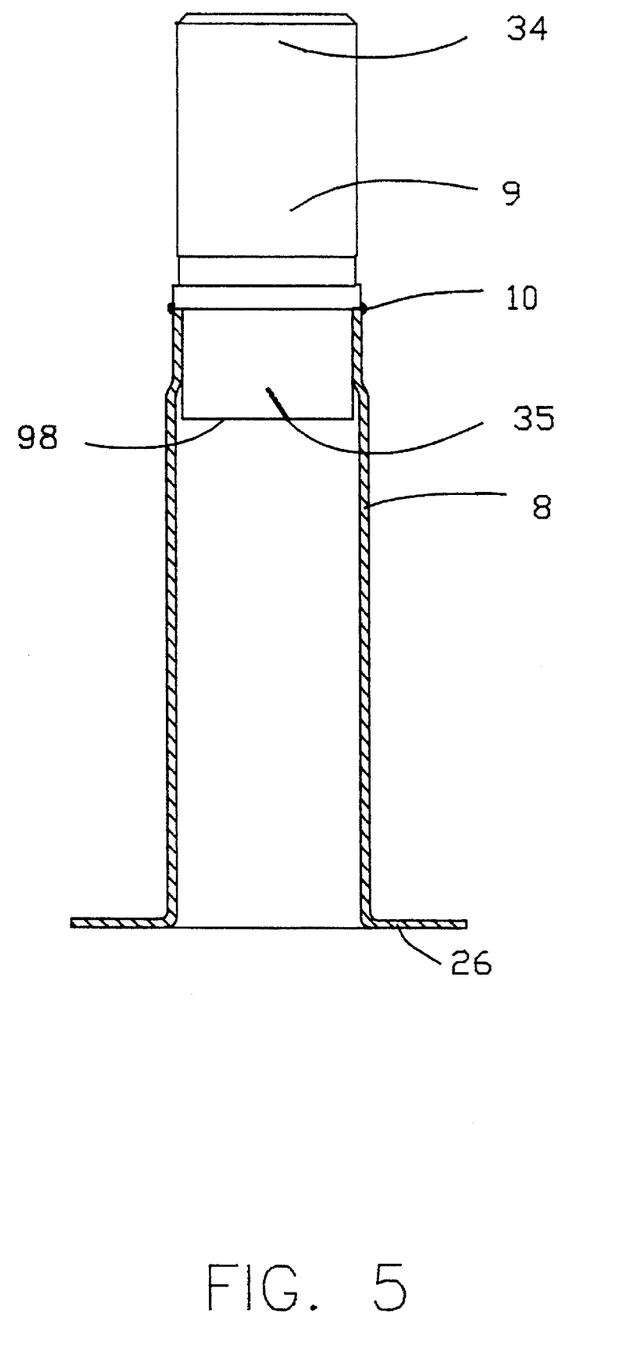
FIG. 5 is a cross-sectional view of the plunger guide and a plan view of the stop welded to the plunger guide.

FIG. 5 illustrates a cross-sectional view of the plunger guide 8 and a plan view of the stop 9. Both the plunger guide 8 and stop 9 in the preferred embodiment are made from stainless steel. The plunger guide 8 and stop 9 are generally cylindrically shaped. The stop 9 has a first end portion 35 and a second end portion 34. The first end portion 35 of the stop 9 has a solid planar face 98. The purpose of the solid planar face 98 is to engage the spring 11 as set forth below. Weld 10 secures the stop 9 to the plunger guide 8. Specifically, weld 10 is a circumferential weld that extends about the circumference of the stop 9 and the adjacent circumference of the plunger guide 8. Plunger guide 8 includes a flange 26.

A spring 11 having a first end portion and a second end portion 42 is employed in the present invention for reasons that follow. Spring 11 of the preferred embodiment is made of stainless steel. Plunger 7 generally resides in the body 14 and the plunger guide 8 as set forth in FIGS. 1 and 2. Spring 11 is disposed between the plunger stop 9 and the plunger 7. Specifically the first end portion 41 of the spring 11 resides in the spring cavity 12 of the plunger 7. The second end portion 42 of the spring engages the solid planar face 98 on first end portion 35 of the plunger stop.

A retaining nut 6 secures the plunger guide including the plunger stop to the body 14. (See, FIGS. 1 and 2.) In the preferred embodiment, the retaining nut is made from stainless steel. The retaining nut 6 has threads 97 which engage threads 23 on the body 14 for lockably engaging the plunger guide and plunger stop with respect to the body 14.

FIG. 1 illustrates an air gap 22, or space, which exists between the plunger stop 9 and the plunger 7. This gap is created by the spring 11 urging plunger 7 toward the frusto-conical inwardly projection 20 of the body 14. In the preferred embodiment, the gap 22 is approximately 0.017 inches plus or minus 0.006 inches.

Figure 6:
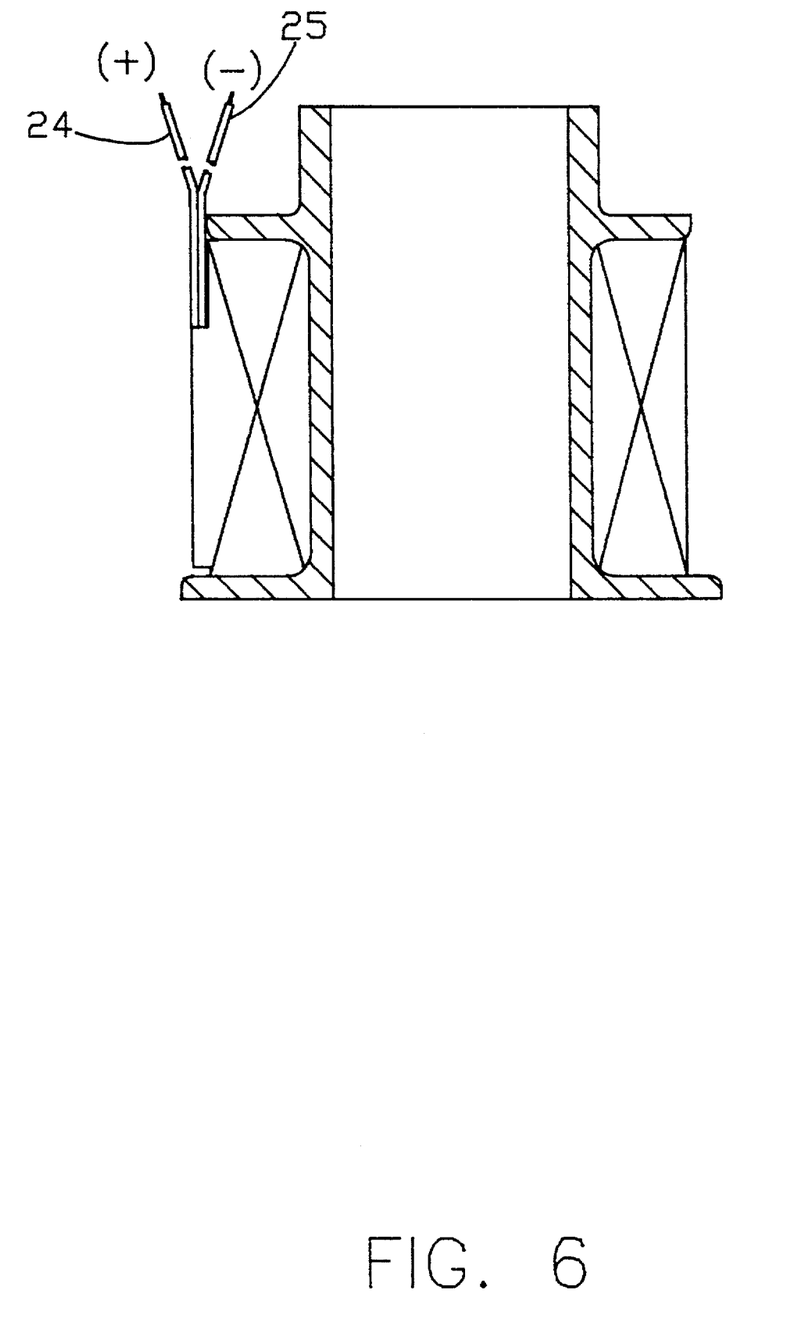
FIG. 6 is a cross-sectional view of the bobbin and electromagnetic coil.

An electromagnetic coil 2 is wound around a bobbin 4. The bobbin of the preferred embodiment of the invention is made of nylon. The bobbin has a start end portion 30 and a finish end portion 33. Additionally, the bobbin has a magnet retaining portion 31.

Figure 7:
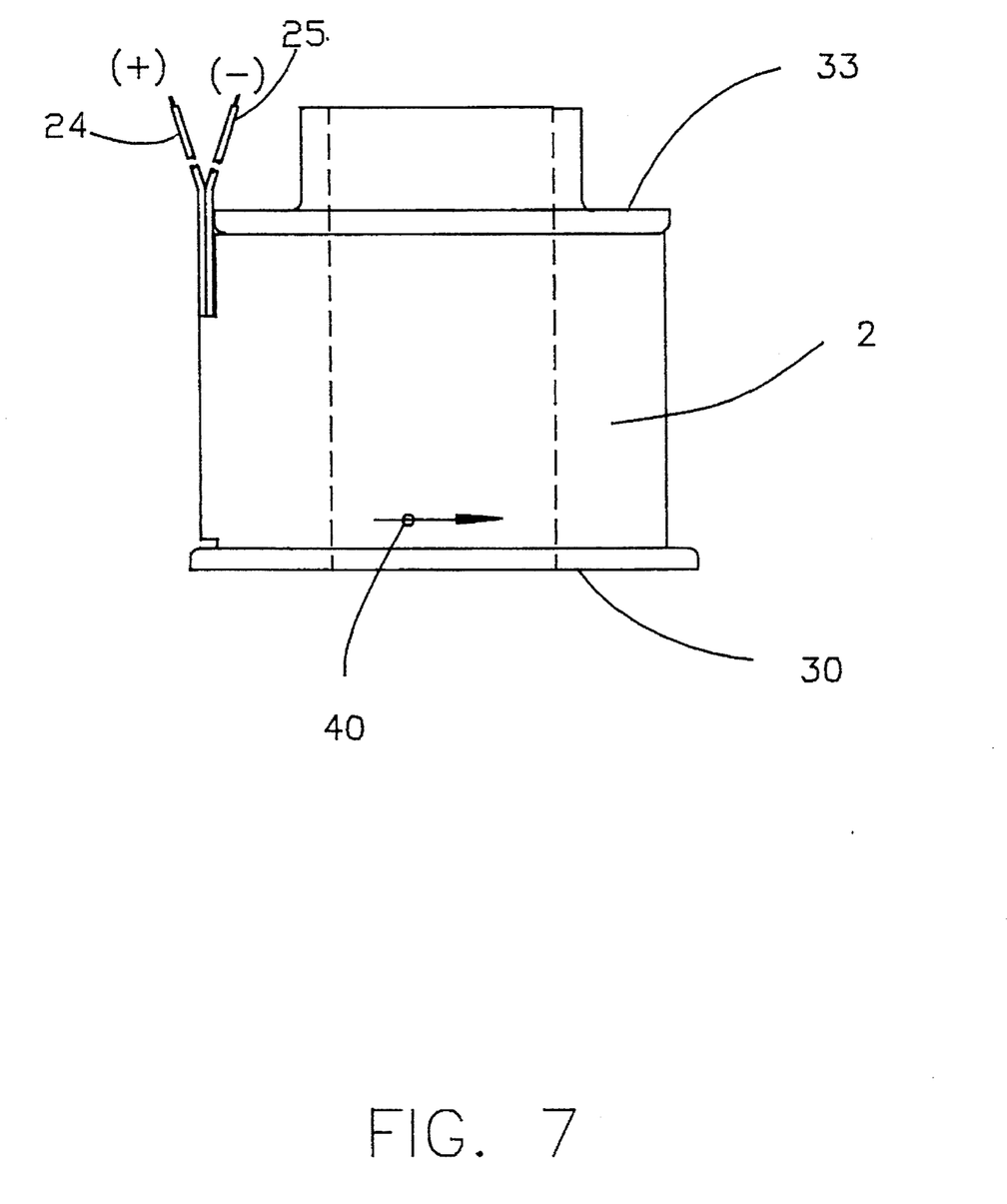
FIG. 7 is a plan view of the bobbin and electromagnetic coil showing the direction of the coil winding.

The electromagnetic coil of the preferred embodiment has approximately 486 turns; employs 31.5 gauge wire; and has a dc resistance of approximately 8.8 ohms. Additionally, the steady state power requirement of the electromagnetic coil, supplied at 4.2+0.00/−0.20 volts dc, is 2.00 watts. Those skilled in the art will recognize that an electromagnetic coil having a different number of turns, a different gauge wire, and different electrical characteristics may be used in the invention. Additionally, the electromagnetic coil 2 has a first lead 24 and a second lead 25 extending therefrom. The electromagnetic coil 2 is wound beginning from the start end portion 30 and concluding at the finish end portion 33 of the bobbin.

The bobbin 4 is generally cylindrically shaped with the exception of the start end portion 30 and the finish end portion 33 which are flanged. FIGS. 6 and 7 illustrate the electromagnetic coil 2 wound around bobbin 4. FIG. 7 illustrates the direction 40 of the winding of the electromagnetic coil 2. The bobbin 2 and the electromagnetic coil 2 are coaxially disposed about the plunger guide, the stop and the plunger.

Figure 9:
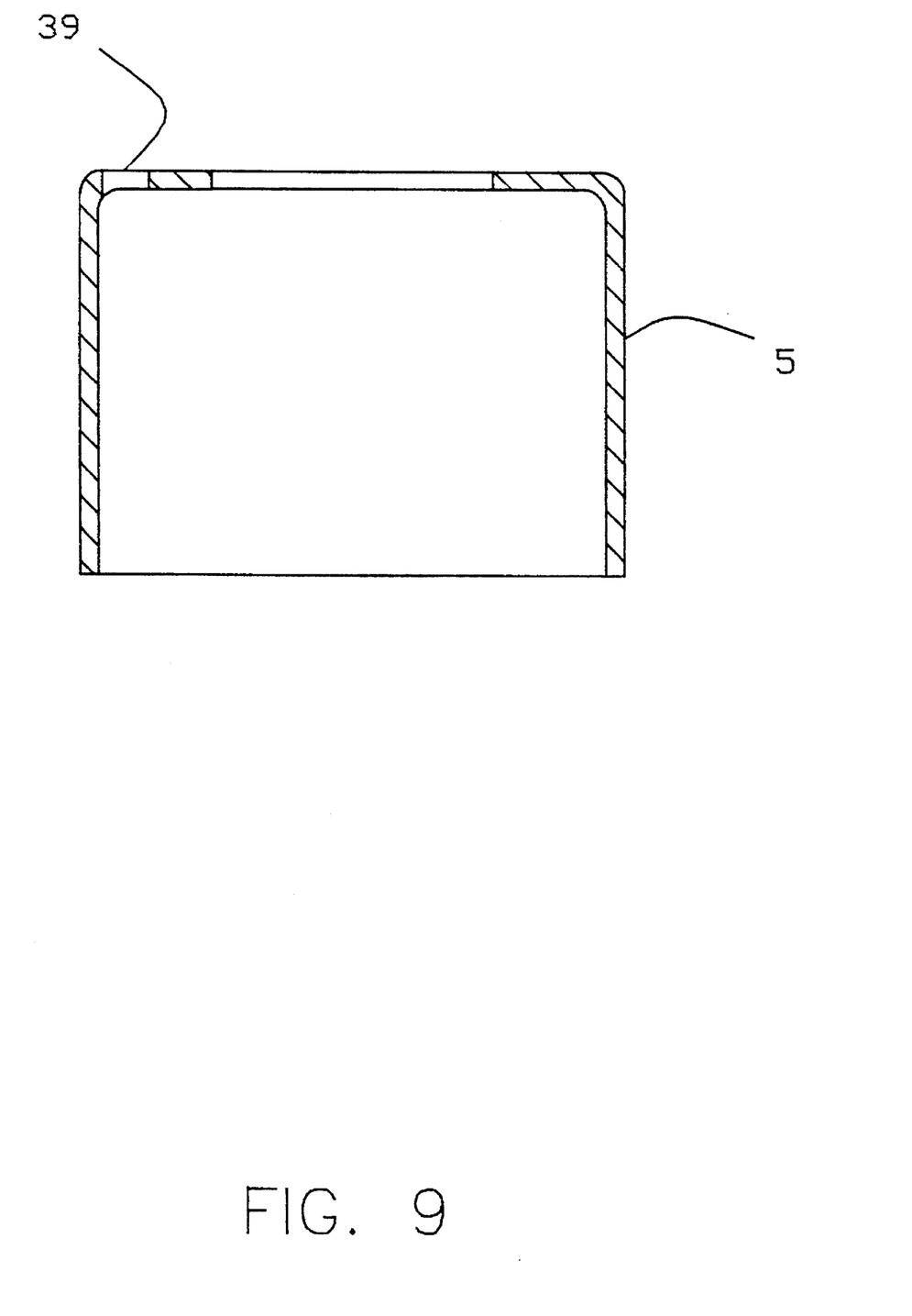
FIG. 9 is a sectional view of the housing.

Housing 5 resides generally around the bobbin 4 and the electromagnetic coil 2. The housing 5 engages a shoulder 96 of the retaining nut 6. Housing 5 of the preferred embodiment is made of steel. The bobbin is free to have a limited amount of movement in the axial and radial directions.

Figure 2:
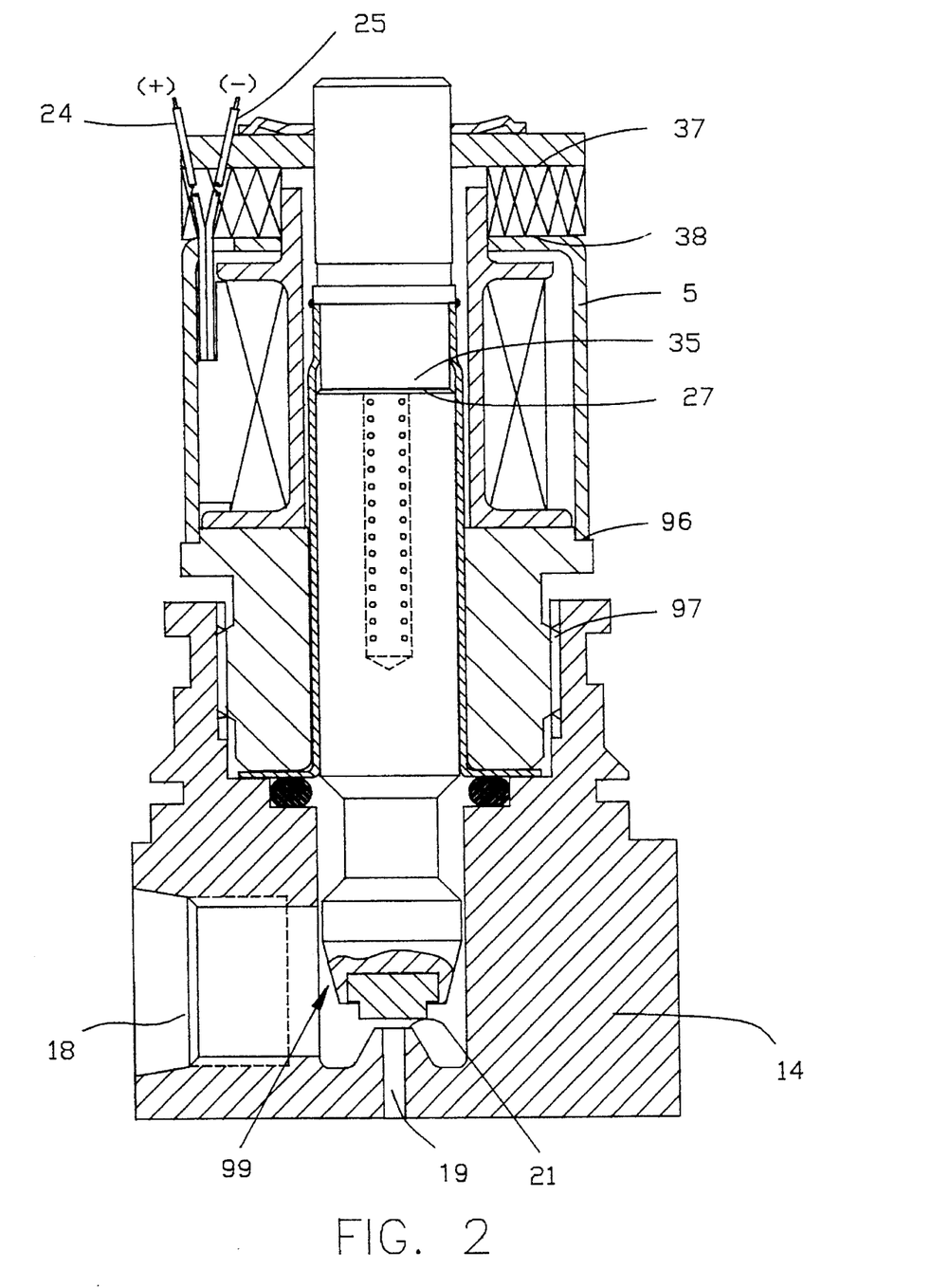
FIG. 2 is a cross-sectional view of the solenoid latching valve showing the plunger in the second position, for example, the valve is open.
Figure 8:
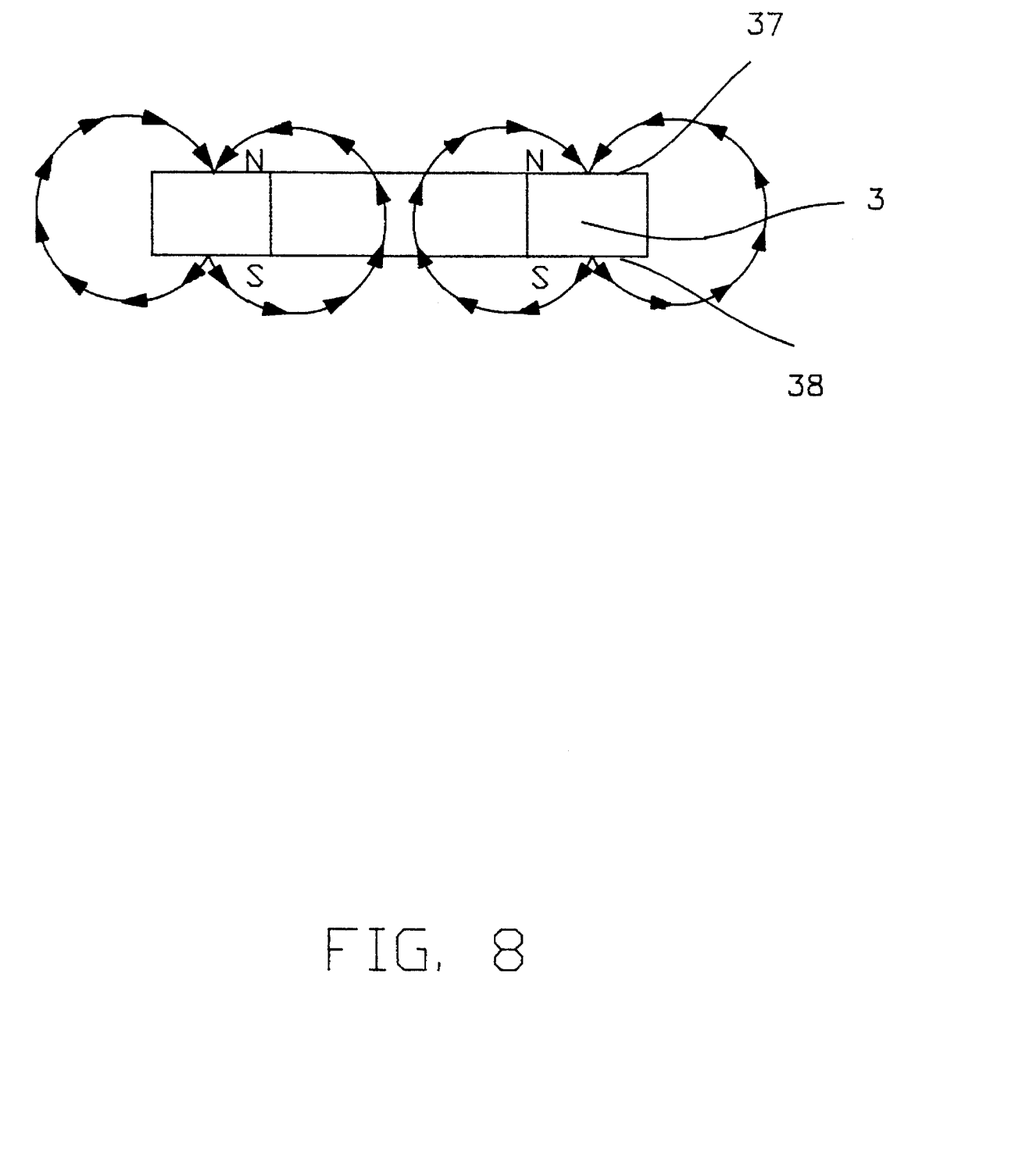
FIG. 8 is a side elevational view of the magnet showing the north and south poles thereof; and, additionally, the lines of magnetic flux are shown.

A magnet 3 having a north pole 37 and a south pole 38 is shown in FIGS. 1, 2 and 8 and is employed in the present invention. The magnet 3 of the preferred embodiment is cylindrically shaped. The magnet 3 of the preferred embodiment is a rubber bonded ferrite magnet. The magnet, additionally, is oriented such that the south pole of the magnet engages the housing 5. The north pole 37 of the magnet 3 is distal to the housing. A cylindrically shaped steel washer 15 and a retaining ring 16 restrain the movement of the magnet 3 and the housing 5. Flexible elastomeric seal 13 is employed adjacent the body 14 and the flange 26 as shown in FIGS. 1 and 2. Flexible elastomeric seal 13 provides a tight seal which will not permit water or other substance to flow from the interior to the exterior of the body in an unwanted fashion at the interface between the flange 26 and the body 13.

FIG. 1 illustrates the position of the plunger with no voltage across electromagnetic lead lines 24 and 25. The spring 11 as shown in FIG. 1 has a sufficiently high spring force so as to insure that the valve 99 seats on valve seat 21. The seal material in the preferred embodiment is Buna-N rubber, a material which provides a good seal on seat 21. Alternate materials can be used instead of Buna-N rubber seal. The plunger 7 in FIG. 1 remains seated against valve seat 21 because the magnetic flux due to magnet 3 is insufficient to cause the plunger to move axially against the force, or resistance, of spring 11. With no voltage across leads 24 and 25, spring 11 urges plunger 7 toward said valve seat 21 creating an air gap 22 of approximately 0.017 inches plus or minus 0.006 inches. Those skilled in the art will recognize that an air gap 22 of a different size may be used in the invention.

FIG. 2 illustrates the plunger 7 in its second position. In the second position valve 99 (including the seal 17) does not engage the valve seat 21. In the second position, FIG. 2 illustrates the valve in the open position. The valve including the plunger have moved approximately 0.017 inches plus or minus 0.006 inches toward the stop 9. The gap 22 does not exist as the plunger 7 abuts the stop. (See, FIG. 2.) FIG. 2 illustrates the position of the plunger 7 after a first electrical current is supplied to the electromagnetic coil 2. The electromagnetic coil is wound in the direction as indicated in FIG. 7.

The plunger 7 must be a specified length (within a certain tolerance). The nominal movement of the plunger is 0.017 inches. If the plunger is too long, then the seal may not disengage the valve seat 21 when the plunger is moved to the second position (open). Therefore, proper selection and machining of the seal material is necessary to ensure proper operation of the invention.

In FIG. 2, the voltage across the first lead 24 and the second lead 25 is 4.2+0.00/−0.20 volts dc, and first lead 24 is positive (+) with respect to negative (−) second lead 25.

In FIG. 2, a first electrical current in the electromagnetic coil flows in a direction from the first lead 24 to the second lead 25. The first electrical current flows in the direction of the winding as shown in FIG. 7. The first electrical current flowing in the direction as indicated in FIG. 7 produces a magnetic field having lines of flux oriented toward said second end portion 34 of said stop. The first electrical current is supplied for approximately 20 milliseconds in the preferred embodiment.

The first electrical current is supplied only for a short duration thus saving energy. Low energy consumption prolongs battery life. The voltage source for operation of the electromagnetic coil 2 is a battery (not shown) that is supplied, typically, with equipment used to retrofit toilet and urinal flushing mechanisms. It is important in certain applications that solenoid valves do not consume very much energy. Particularly, it is necessary that the electromagnetic coils employed in such solenoid valves do not consume much energy. Therefore, means (not shown) are employed to switchably engage the first lead 24 and the second lead 25. By switchably engage, it is meant that the polarity of the voltage across the leads is alternately reversed with a break, or discontinuation, of the voltage altogether before reversal. The switching of the voltage is controlled by an external control system (not shown).

It will be understood by those skilled in the art that there will be no voltage across the electromagnetic coil most of the time. Conventional solenoid valves employ coils which are continuously energized as there is an abundant energy source available. The present invention is extremely valuable when an abundant energy source is not available and battery power or the like must suffice.

FIG. 1 illustrates the invention in two circumstances. The first circumstance is when there is no voltage across electromagnetic coil leads 24 and 25. The second circumstance is when there is voltage (having the polarity shown in FIG. 1) across the leads of the electromagnetic coil and the plunger 7 has already moved from the second position (open) to the first position (closed) as shown in FIG. 1. The magnetic flux created by a second current in the electromagnetic coil magnetically urges the plunger toward the valve seat 21 (first position). Additionally, and in conjunction with the magnetic field produced by the second electrical current, spring 11 mechanically urges the plunger toward the valve seat.

FIG. 2, similarly, illustrates the invention in two circumstances. The first circumstance is when there is no voltage across leads 24 and 25 of the electromagnetic coil. The second circumstance is when there is voltage (having the polarity shown in FIG. 2) across the leads of the electromagnetic coil and the plunger 7 has already moved from the first position (closed) to the second position (open) as shown in FIG. 2. The magnetic flux created by the first current in the electromagnetic coil magnetically urges the plunger away from the valve seat 21 opening the valve and permitting communication between the inlet 18 and outlet 19 of the body 14. Additionally, and additively, magnet 3 magnetically urges plunger 7 in the direction of the second portion 34 of the stop 9.

When necessary to close the valve, for example, to cause the valve 99 (and the seat 17) to engage the valve seat 21, a second electrical current having a direction opposite to the first electrical current is supplied to the electromagnetic coil 2. FIG. 1 illustrates the position of the plunger such that the valve is residing on the valve seat and communication between the inlet 18 and the outlet 19 is prohibited. In other words, FIG. 1 illustrates the valve in the closed position. It is necessary to supply a second electrical current as aforestated to cause the plunger to move from its second position (open) as shown in FIG. 2 to its first position (closed) as shown in FIG. 1. A magnetic field oppositely directed to the magnetic field of the magnet is created by the second electrical current which moves the plunger 7 against the force of magnet 3.

Returning to FIG. 2, the first electrical current in said electromagnetic coil in combination with the magnet, magnetically urge the plunger 7 to abut the guide stop. Once the plunger is brought into engagement with the guide stop the magnetic flux of the magnet 3 is sufficient to hold the plunger against the stop, overcoming the force of the spring 11.

To close the solenoid valve it is necessary that a second electrical current in a direction opposite to the first electrical current exists in the electromagnetic coil 2. This is accomplished by switchably engaging the first lead 24 and the second lead 25 such that a positive voltage is applied to the second lead 25 with respect to the negative second lead 24. A short duration (approximately 20 milliseconds in length) second electrical current is applied to the electromagnetic coil in a direction opposite the first electrical current. The second electrical current creates lines of magnetic flux in a direction opposite to the direction of the lines of magnetic flux caused by the first electrical current. Specifically, the second electrical current magnetically urges the plunger 7 away from the stop 9. The spring 11 assists in the movement of the plunger 7 away from the stop 9 as was previously described above. The second electrical current in the electromagnetic coil, in combination with the spring, magnetically and mechanically, urge the plunger away from the stop. Once the plunger moves away from the stop it is held against the valve seat by virtue of the force of the spring 11.

While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed is:

1. A solenoid latching valve comprising a body, said body including an inlet, an outlet, a plunger, a plunger guide, said plunger guide including a stop and a flange, a retaining nut, said retaining nut engaging said flange of said plunger guide prohibiting movement of said plunger guide with respect to said body, said plunger residing within said plunger guide and said body, a bobbin, an electromagnetic coil, said electromagnetic coil residing around said bobbin, said bobbin residing around said plunger guide, a housing, said housing residing around said electromagnetic coil and said bobbin, a magnet, a washer and a retaining ring, said retaining ring prohibiting movement of said washer, housing and magnet, a spring, said spring interposed between said plunger stop and said plunger, said plunger movable between first and second positions, said spring urging said plunger toward said first position, said plunger in said first position isolates said inlet from said outlet, said plunger in said second position permits communication between said inlet and outlet, said magnet urging said plunger toward, but not to, said second position of said plunger, a first electrical current having a first direction in said electromagnetic coil, said magnet in combination with said first electrical current having a first direction in said electromagnetic coil magnetically urge said plunger to said second position and against said stop of said plunger permitting communication between said inlet and outlet, a second electrical current having a second direction in said electromagnetic coil, said second direction of said second electrical current being opposite to said first direction of said first electrical current, said second electrical current in said electromagnetic coil in combination with said spring, magnetically and mechanically, respectively, urge said plunger to said first position prohibiting communication between said inlet and outlet ports.

2. A solenoid latching valve as claimed in claim 1 wherein said magnet latches said plunger in said second position upon the discontinuation of said first electrical current.

3. A solenoid latching valve as claimed in claim 2 wherein said spring maintains said plunger in said first position upon the discontinuation of said second electrical current.

4. A solenoid latching valve as claimed in claim 3 wherein said electromagnetic coil includes first and second leads.

5. A solenoid latching valve as claimed in claim 4 wherein said first and second leads switchably engage a direct current voltage source.

6. A solenoid latching valve as claimed in claim 5 wherein said direct current voltage source is 4.2+0.00/−0.20 volts d.c.

7. A solenoid latching valve as claimed in claim 6 wherein said first and second electrical currents are momentary electrical currents.

8. A solenoid latching valve as claimed in claim 7 wherein said momentary electrical currents are less than or equal to 20 ms in duration.

9. A solenoid latching valve as claimed in claim 8 wherein said magnet is a flexible rubber magnet, said flexible rubber magnet being generally cylindrically shaped, said flexible rubber magnet includes north and south poles, said north pole of said magnet being adjacent to said washer.

10. A solenoid latching valve as claimed in claim 9 wherein: said plunger includes first and second end portions, said second end portion having a recess therein, said plunger stop includes first and second end portions, said spring includes first and second end portions, said plunger includes first and second end portions, said first end portion of said spring resides in said recess of said plunger and said second end portion of said spring engages said first end portion of said stop urging said stop apart from said plunger.

11. A solenoid latching valve as claimed in claim 10 wherein said body includes an inwardly extending frusto-conical portion, said first end portion of said plunger includes a valve, said valve engaging said inwardly extending frusto-conical portion of said body when said plunger is in said first position.

12. A solenoid latching valve as claimed in claim 11 wherein said valve is rubber, said body includes an interior and an exterior, and wherein said inlet of said body is a bore extending from said interior to said exterior of said body, said outlet of said body is a bore extending from said interior of said body through said inwardly extending frusto-conical portion to said exterior of said body.

13. A solenoid latching valve as claimed in claim 12 further including sealing means between said body and said plunger guide.

14. A solenoid latching valve as claimed in claim 13 wherein said bobbin is nylon.

* * * * *